US009168891B2

(12) United States Patent
Lee et al.

(10) Patent No.: US 9,168,891 B2
(45) Date of Patent: Oct. 27, 2015

(54) RETRACTOR FOR A SEAT BELT, AND CLUTCH USED IN SAME

(75) Inventors: Kyung Sang Lee, Anyang-si (KR); Jung Hun Choi, Hwaseong-si (KR); Byoung Su Kim, Hwaseong-si (KR); Taek Lim Song, Gunpo-si (KR)

(73) Assignee: Wooshin Safety Systems Co., Ltd., Hwaseong-si (KR)

( * ) Notice: Subject to any disclaimer, the term of this patent is extended or adjusted under 35 U.S.C. 154(b) by 299 days.

(21) Appl. No.: 13/809,406

(22) PCT Filed: Jul. 8, 2011

(86) PCT No.: PCT/KR2011/005002
§ 371 (c)(1),
(2), (4) Date: Apr. 18, 2013

(87) PCT Pub. No.: WO2012/005538
PCT Pub. Date: Jan. 12, 2012

(65) Prior Publication Data
US 2013/0214080 A1    Aug. 22, 2013

(30) Foreign Application Priority Data

Jul. 9, 2010    (KR) .................. 10-2010-0066456
Jan. 7, 2011    (KR) .................. 10-2011-0001788

(51) Int. Cl.
*B65H 75/30*        (2006.01)
*B60R 22/46*        (2006.01)
*F16D 11/00*        (2006.01)

(52) U.S. Cl.
CPC ............... *B60R 22/46* (2013.01); *F16D 11/00* (2013.01); *B60R 2022/468* (2013.01); *B60R 2022/4666* (2013.01)

(58) Field of Classification Search
CPC ............................................ B60R 2022/468
USPC .............................. 242/394, 394.1, 375, 376
See application file for complete search history.

(56) References Cited

U.S. PATENT DOCUMENTS 6,499,554 B1    12/2002  Yano et al.
2004/0075008 A1*  4/2004  Mori et al. ................. 242/390.8
(Continued)

FOREIGN PATENT DOCUMENTS

| JP | 2007-099257 A | 4/2007 |
|----|---------------|--------|
| KR | 10-2008-0016501 A | 2/2008 |
| KR | 10-0883427 B1 | 2/2009 |
| KR | 10-0914022 B1 | 8/2009 |
| KR | 10-2010-0110681 A | 10/2010 |

OTHER PUBLICATIONS

PCT International Search Report for PCT Counterpart Application No. PCT/KR2011/005002, 5 pages, (Feb. 24, 2012).

(Continued)

*Primary Examiner* — Sang Kim
(74) *Attorney, Agent, or Firm* — Blakely, Sokoloff, Taylor & Zafman LLP

(57) ABSTRACT

A retractor for a seat belt is disclosed, including a frame, a spool that is mounted rotatably to the inside of the frame, a webbing that is wound on the spool to be pulled-in constantly to the inside of the frame and pulled-out freely from the inside of the frame to the outside thereof, a controller for recognizing vehicle information and controlling the pulling-in of the webbing, a motor for generating a driving force to rotate the spool in accordance with the control of the controller and a clutch for receiving the driving force from the motor and transmitting the driving force to the spool wherein the clutch includes; a driven gear that receives the driving force from a driving gear provided on a rotation shaft of the motor; a plate that is provided facing to one end of the driven gear and inter-connected with the driven gear; a braking disk that is provided to be engaged with the other face opposing one face of the plate, facing to one end of the driven gear, and is in friction with the plate to stay temporally the plate when the plate is inter-connected with the driven gear; and a locking pole that is mounted pivotably to the plate and pivoted by a rotation of the driven gear when the plate is stayed temporally by the braking disk to be meshed with a pinion gear provided on a rotation shaft of the spool thereby transmitting the driving force transmitted from the driven gear to the spool.

20 Claims, 10 Drawing Sheets

(56) References Cited

U.S. PATENT DOCUMENTS

| | | |
|---|---|---|
| 2005/0012320 A1 | 1/2005 | Tobata |
| 2007/0246593 A1* | 10/2007 | Asagiri et al. ............... 242/390 |
| 2007/0284870 A1* | 12/2007 | Saito et al. .................. 280/806 |
| 2008/0252060 A1* | 10/2008 | Saito et al. .................. 280/806 |
| 2011/0006147 A1* | 1/2011 | Umakoshi et al. ........... 242/374 |

OTHER PUBLICATIONS

Notice of Allowance for Korean Patent Application No. 10-2010-0066456, 3 pgs., (Feb. 8, 2012).

Notice of Allowance for Korean Patent Application No. 10-2011-0001788, 3 pgs., (Aug. 10, 2012).

* cited by examiner

RETRACTOR FOR A SEAT BELT, AND CLUTCH USED IN SAME

CROSS-REFERENCE TO RELATED APPLICATIONS

This patent application is a U.S. National Phase Application under 35 U.S.C. §371 of International Application No. PCT/KR2011/005002, filed Jul. 8, 2011, entitled RETRACTOR FOR A SEAT BELT, AND CLUTCH USED IN SAME, which claims priority to Korean Patent Application No. 10-2010-0066456, filed Jul. 9, 2010, and Korean Patent Application No. 10-2011-0001788, filed Jan. 7, 2011.

TECHNICAL FIELD

The present invention relates to a retractor for a seat belt and a clutch used therein, and more particularly, to a retractor for a seat belt and a clutch used therein through which webbing wound on a spool is pulled-in by driving a motor in accordance to a vehicle state.

BACKGROUND

Generally, when a person boards a vehicle or a boarding device, several safety devices are provided to prevent a passenger from being separated from the vehicle or the boarding device due to impact produced from a collision between vehicles or with other objects.

Among the several safety devices, a representative safety device is a seat belt wherein webbing constituting the seat belt surrounds a lower abdomen and a chest of the passenger to fix stably him/her to a seat thereby preventing the passenger from being separated from the vehicle or the boarding device.

However, recently, various technologies of the seat belt have been developed so that the seat belt is used not only to prevent a passenger from being separated from a vehicle or a boarding device when a vehicle collides with another vehicles or other objects but also to warn to a passenger or protect the passenger in advance even when a vehicle accelerates or rotates rapidly.

That is, various technologies have been developed such that a passenger can be protected in advance from a collision that may be occurred afterwards by figuring-out information of a currently driving vehicle, pulling the webbing constituting a seat belt toward the passenger and notifying the vehicle information to the passenger.

SUMMARY

An object of the present invention relates to provide a retractor for a seat belt, capable of warning to a passenger or protecting in advance the passenger from a collision that may occurred afterwards by driving a motor and pulling-in a webbing wound on a spool.

Another object of the present invention relate to provide a clutch used properly for the retractor for a seat belt.

The object of the present invention is not limited thereto; however, other objects will be understood obviously by a person who has ordinary knowledge in a field to which the present invention pertains.

The objects of the present invention will be achieved by the embodiments of a retractor for a seat belt of the present invention.

Here, a retractor for a seat belt according to an embodiment of the present invention may include a frame, a spool that is mounted rotatably to the inside of the frame, a webbing that is wound on the spool to be pulled-in constantly to the inside of the frame and pulled-out freely from the inside of the frame to the outside thereof, a controller for recognizing vehicle information and controlling the pulling-in of the webbing, a motor for generating a driving force to rotate the spool in accordance with the control of the controller and a clutch for receiving the driving force from the motor and transmitting the driving force to the spool wherein the clutch comprises; a driven gear that receives the driving force from a driving gear provided on a rotation shaft of the motor; a plate that is provided at place opposing one end of the driven gear and inter-connected with the driven gear; a braking disk that is provided to be engaged with the other face of the plate opposing one face of the plate, facing to one end of the driven gear, and is in friction with the plate to stay temporally the plate when the plate is inter-connected with the driven gear; and a locking pole that is mounted pivotably to the plate and pivoted by a rotation of the driven gear when the plate is stayed temporally by the braking disk, to be meshed with a pinion gear provided on a rotation shaft of the spool thereby transmitting the driving force transmitted from the driven gear to the spool.

At this time, the driven gear may be provided with gear teeth on an outer peripheral surface to receive the driving force from the driving gear and has a hole through which the pinion gear passes on a middle, and one end of the driven gear, opposing the plate, is provided to be dented to receive the plate and the locking pole.

Further, the plate may be formed in a circular shape corresponding to a shape of the indented one end of the driven gear to be inserted therein and has a hole through which the pinion gear passes on a middle wherein the locking pole is mounted pivotably on one face of the plate opposing the indented one end of the driven gear and the other face thereof opposing the one face is engaged with the braking disk.

Furthermore, the locking pole may be mounted pivotably on one face of the plate, opposing the indented one end of the driven gear wherein the locking pole is pivoted to protrude from an inner peripheral surface of a hole provided on the driven gear to be meshed with the pinion gear, or is pivoted to be received into the indented one end of the driven gear to be separated from the pinion gear.

At this time, the locking pole may be guided by a guide provided on the indented one end of the driven gear to be pivoted wherein the guide is configured with a first oblong groove into which a guide protrusion provided on one side of the locking pole is inserted and the first oblong groove is formed from an outer peripheral surface of the driven gear to a middle thereof, and the guide protrusion moves along the first oblong groove when the driven gear rotates thereby guiding the locking pole to be pivoted.

Meanwhile, a gear train may be provided between the driving gear and the driven gear and the driven gear receives the driving force from the driving gear through the gear train.

In a retractor for a seat belt according to the embodiments of the present invention, the braking disk may include: a body in a circular shape corresponding to a shape of the other face of the plate, provided with a hole through which the pinion gear passes at a middle thereof; a staying protrusion provided on an outer peripheral surface of the body to be stayed on a cover that surrounds the frame or the clutch; and a friction protrusion that protrudes from one face of the body opposing the other face of the plate to be in friction with the plate.

Here, a slit may be formed on a part of a boundary surface between the body and the friction protrusion so that the friction protrusion is movable toward the other face of the body from which the friction protrusion 430 protrudes, opposing the one face thereof.

At this time, the friction protrusion may be formed as plural in a radial direction around the hole formed on the body wherein the boundary surface between the body in which the slit is formed and the friction protrusion is arranged on an imaginary circumference around the hole formed on the body.

Further, a second oblong groove may be formed on the indented one end of the driven gear along the imaginary circumference around the hole formed on a middle of the driven gear, and a catching member that is caught over one side of a second oblong groove is provided on one face of the plate, opposing the indented one end of the driven gear, to rotate the driven gear and the plate together.

At this time, a distance between the catching member and one side of the second oblong groove is separated before the driven gear receives the driving force from the driving gear, but the plate is stayed temporally with friction with the braking disk when the locking pole pivots and thus the separated distance between the catching member and one side of the second oblong groove is decreased gradually and the catching member is caught over one side of the second oblong groove while it is engaged therewith when the locking pole is pivoted to be meshed with the pinion gear, and the catching member is kept in a state of being caught over one side of the second oblong groove when the driven gear receives the driving force from the driving gear.

Meanwhile, the braking disk may be formed with a circular plate corresponding to a shape of the other face of the plate, on a middle of which a hole through which the pinion gear passes is formed, and it comprises a body that is stayed on a cover surrounding the frame or the clutch, to be in friction with the plate.

Here, the plate may be stayed temporally through the staying member mounted between the plate and the braking disk when the plate is inter-connected with the driven gear to increase further friction between the plate and the braking disk.

At this time, the staying member may be made of an elastic member in a ring shape where both ends of the elastic member are fixed to the plate and an inner peripheral surface of the elastic member is engaged with the protrusion in a circular shape provided on the braking disk.

Further, the indented one end of the driven gear may be provided with a contact member to be engaged with a contact portion that protrudes from one face of the first plate to rotate the driven gear and the first plate after the locking pole is pivoted to be meshed with the pinion gear.

At this time, a distance between the contact member of the driven gear and the contact portion of the first plate may be separated before the driven gear receives the driving force from the driving gear, but the first plate is stayed temporally with friction with the second plate when the locking pole pivots and thus the separated distance between the contact member of the driven gear and the contact portion of the first plate is decreased gradually, and the contact member of the driven gear and the contact portion of the first plate are engaged after the locking pole is pivoted to be meshed with the pinion gear.

Meanwhile, the objects will be achieved by the embodiments of a clutch used in the retractor for a seat belt of the present invention.

Here, a clutch used in a retractor for a seat belt through which a webbing wound on a spool is pulled-in by driving a motor in accordance with vehicle information, may includes: a driven gear that receives a driving force from a driving gear provided on a rotation shaft of the motor; a plate that is provided at a place opposing one end of the driven gear and inter-connected with the driven gear; a locking pole that is mounted pivotably on the plate and is pivoted by a rotation of the driven gear to be meshed with the pinion gear provided on a rotation shaft of the spool thereby transmitting the driving force transmitted from the driven gear to the spool; and a braking disk that is fixed to one side of a cover surrounding the clutch and is in friction with the other face of the plate opposing one face thereof facing to the indented one end of the driven gear when the plate is inter-connected with the driven gear thereby staying temporally the plate until the locking pole is meshed with the pinion gear.

At this time, the braking disk may include a friction protrusion that protrudes toward the plate to be in friction with the other face of the plate wherein a slit is formed on a part of a boundary surface where the friction protrusion is formed so that the friction protrusion is movable to a direction opposing a protruding direction of the friction protrusion.

Further, a clutch used in a retractor for a seat belt through which a webbing wound on a spool is pulled-in by driving a motor in accordance with vehicle information, may includes: a driven gear that receives a driving force from a driving gear provided on a rotation shaft of the motor; a plate that is provided at a place opposing one end of the driven gear and inter-connected with the driven gear; a braking disk that is provided to be engaged with the plate and is fixed to a cover surrounding the clutch to be in friction with the plate when the plate is inter-connected with the driven gear thereby staying temporally the plate; and a locking pole that is mounted pivotably to the plate and is pivoted by a rotation of the drive gear to be meshed with the pinion gear provided on a rotation shaft of the spool when the plate is stayed temporally by the braking disk thereby transmitting the driving force transmitted from the driven gear to the spool.

At this time, the clutch used in a retractor for a seat belt may further include a staying member which is made of elastic member in a ring shape, both ends of which are fixed to the plate, an inner peripheral surface of which is engaged with a circular protrusion provided on the braking disk wherein a friction extent between the plate and the braking disk is increased by staying temporally the plate when the plate is inter-connected with the driven gear.

According to the retractor for a seat belt configured as described-above according to an embodiment of the present invention, a motor is driven in accordance with vehicle information to pull-in webbing wound on a spool so that it can notify to a passenger, reduce uncontrolled behavior of the passenger from a collision that may occurred afterwards and improve location safety of the passenger.

Further, according to the clutch used in the retractor for a seat belt configured as described-above according to an embodiment of the present invention, a driving force generated from a motor can be transmitted promptly and accurately to a spool and also the driving force cannot transmitted by disengaging promptly and accurately the motor and the spool when the motor is driven reversely.

THE NUMBER OF ELEMENTS AT DRAWINGS

Figure 1:
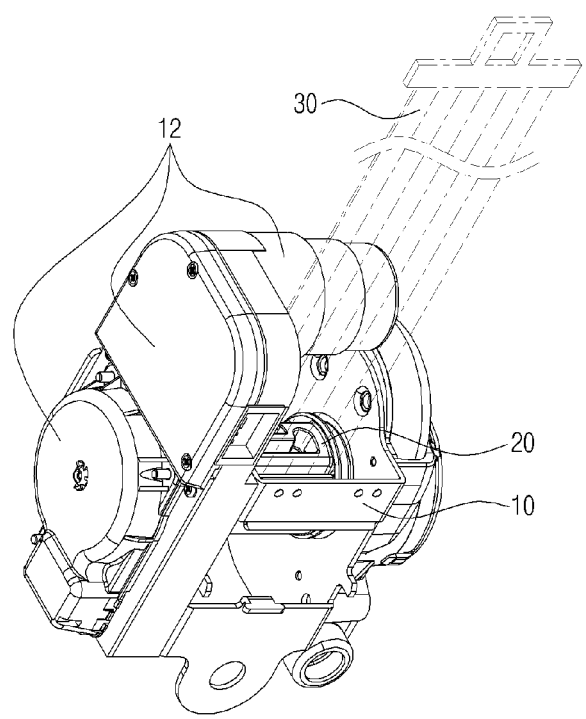
FIG. 1 is a perspective view illustrating an assembled reactor for a seat belt according to an exemplary embodiment of the present invention.

10: frame 12: cover 20: spool
22: pinion gear 30: webbing 40: controller
50: motor 52: driving gear 54: motor shaft
56: e-ring 60: clutch 70: gear train
100: driven gear 110: gear teeth 120: hole
140: 1st oblong groove 150: 2nd oblong groove
160: contact member
200: plate 220: coupling pin 230: catching member
240: mounting portion 250: contact portion
300: locking pole 310: catching portion
320: coupling hole 330: guide protrusion
400: braking disk 410: body 420: staying protrusion
430: friction protrusion 440: slit
450: circular protrusion 500: staying member

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
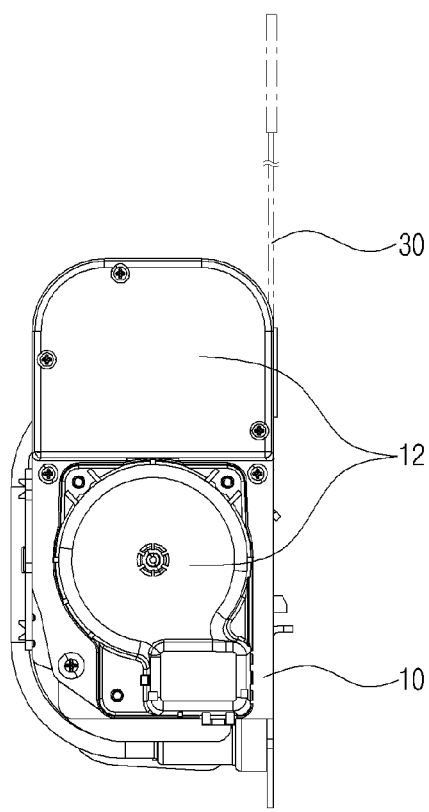
FIG. 2 is a side view illustrating an assembled reactor for a seat belt according to an exemplary embodiment of the present invention.
Figure 3:
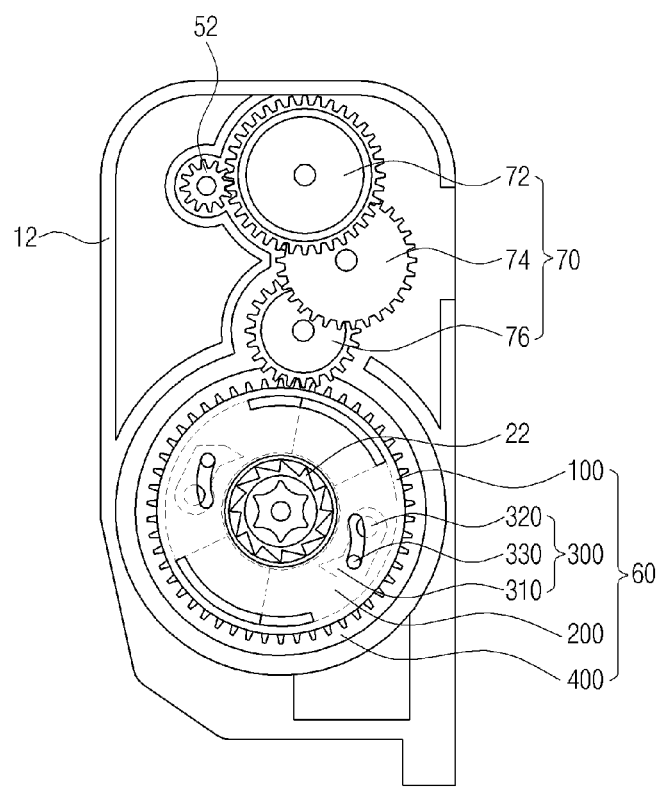
FIG. 3 is a side view illustrating an assembled reactor for a seat belt, excluding a cover as shown in FIG. 2.
Figure 4:
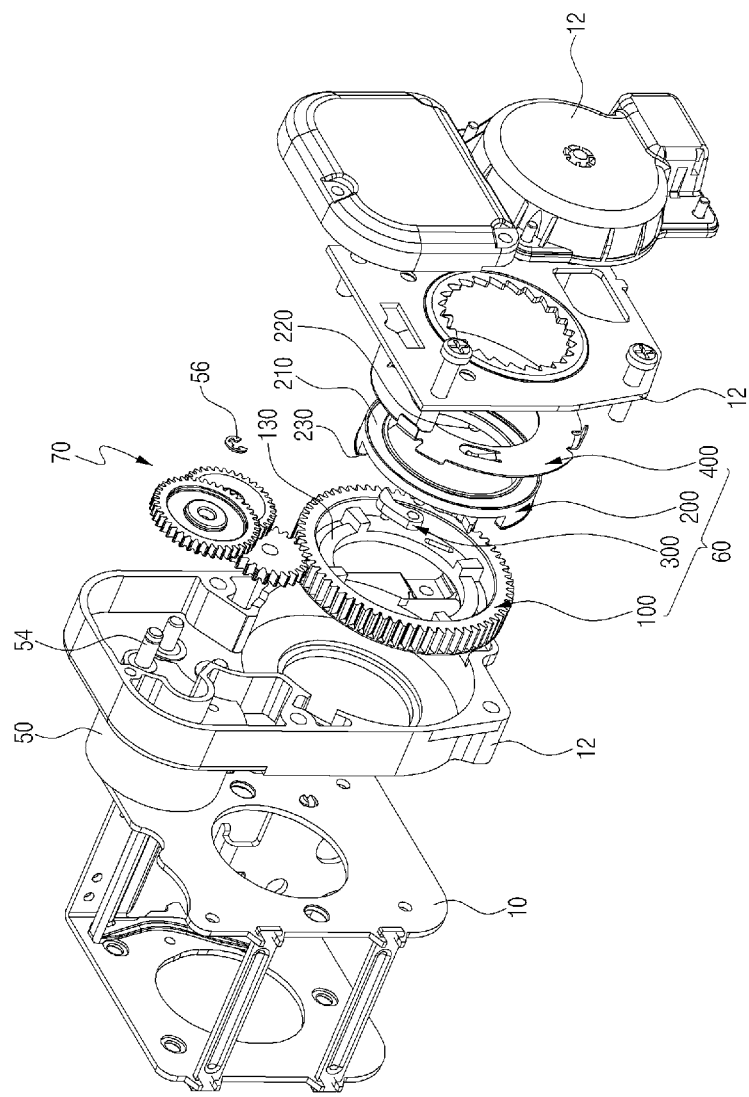
FIG. 4 is an exploded-perspective view illustrating a retractor for a seat belt according to an exemplary embodiment of the present invention.

First, referring to FIGS. 1 to 4, a configuration of a retractor for a seat belt according to an embodiment of the present invention will be described. Here, FIG. 1 is a perspective view illustrating an assembled reactor for a seat belt according to an exemplary embodiment of the present invention, FIG. 2 is a side view illustrating an assembled reactor for a seat belt according to an exemplary embodiment of the present invention, FIG. 3 is a side view illustrating an assembled reactor for a seat belt, excluding a cover as shown in FIG. 2, and FIG. 4 is an exploded-perspective view illustrating a retractor for a seat belt according to an exemplary embodiment of the present invention.

As shown FIGS. 1 to 4, a retractor for a seat belt according to an embodiment of the present invention may include a frame 10, a spool 20, a webbing 30, a controller (reference numeral is not indicated in the drawings), a motor 50 and a clutch 60.

The frame 10 forms an outer shape of the retractor for a seat belt according to an embodiment of the present invention, and receives the spool 20 and the webbing 30 wound on the spool 30 therein, which are described later. The frame may 10 be made of material such as metal to ensure a predetermined strength since it may affect pulling-in or pulling-out of the webbing when the frame 10 is dented due to external impact. Further, a cover 12 may be arranged on one side of the frame 10 for receiving and protecting the controller 40, the motor 50, the clutch 60, a gear train 70, etc., as described later. At this time, the cover 12 may be formed as a single piece, which is formed separately and mounted entirely to one side of the frame 10, or may be formed as multi pieces, which are formed with respect to the controller 40, the motor 50, the clutch 60 and the gear train 70, etc., respectively, and mounted to the frame 10, respectively.

Meanwhile, both ends of the spool 20 are mounted rotatably to the inside of the frame 10 and the spool serves as a winder of the webbing 30. Here, the clutch 60 is mounted to one end of the spool 20 and an elastic unit (reference numeral is not given) for allowing the webbing 30 to be pulled-in constantly to the inside of the frame 10 is mounted to the other end of the spool 20.

Meanwhile, the webbing 30 surrounds a part of a body of a passenger who is seating on a seat on which the retractor for a seat belt according to an embodiment of the present invention is mounted wherein it may be made of comparatively soft fabric material in order to increase wearable feeling of the passenger. The webbing 30 as described-above has been wound on the spool 20 to be pulled-in constantly to the inside of the frame 10 and to be pulled-out freely to the outside of the frame 10. Through this configuration, one operational direction of pulling-in and pulling-out of the webbing 30 is restricted while not restricting the other operation direction thereof and thus the pulling-in and the pulling-out of the webbing 30 can be adjusted easily. That is, as confirmed in an operation of the retractor for a seat belt according to an embodiment of the present invention, as will be described later, through this configuration of the webbing 30, the clutch 60 can adjust all of the pulling-in and the pulling-out of the webbing 30 by only adjusting the pulling-in of the webbing 30.

Meanwhile, the controller 40 determines whether to pull-in the webbing 30 by recognizing information of a vehicle to which the retractor for a seat belt according to an embodiment of the present invention is mounted, and orders to motor, as will be described later. At this time, the vehicle information refers to a generic title of a risk signal recognized by a driving speed of a vehicle, a slope when the vehicle drives along an inclined road, and a rotation angle when the vehicle left/right-rotates, etc. The controller 40 may be configured to communicate with an electronic controller to handle all information of a vehicle.

Meanwhile, the motor 50 generates a driving force to rotate the spool 20 with receiving an order from the controller 40 wherein the motor 50 may be selected variously in consideration of a rotation velocity thereof and a magnitude of the driving force and also a size of the motor 50 itself to be received into the cover 12. At this time, when the driving force generated by the motor 50 becomes large, the size of the motor 50 becomes large and thus it is important to select a proper motor. Accordingly, when it is difficult to select properly the motor 50, the retractor for a seat belt according to an embodiment of the present invention may include additionally the gear train 70, as described later.

Meanwhile, the clutch 60 receives the driving force from the motor 50 and transmits it to the spool 20, which will be described in detail later, referring to FIGS. 5 to 7.

Meanwhile, the gear train 70 may further included to constitute the retractor for a seat belt according to an embodiment of the present invention when it is difficult to meet terms of the motor 50. That is, the gear train 70 may be consist of a reduction gear set of a combination of a plurality of gears 72, 74, 76 and may transmit the driving force enough to pull-in the webbing 30 while reducing comparatively rotation velocity of the motor 50. Accordingly, when the retractor for a seat belt according to an embodiment of the present invention includes the gear train 70, the motor 50 of a small size can be used to be advantageous to select the motor 50 while obtaining sufficient driving force.

At this time, when gear teeth are not coupled directly to the motor 50, a first gear among the plurality of gears constituting the gear train 70 is coupled to a motor shaft 54 and further a e-ring 56 may be provided to prevent the first gear from being disengaged.

Meanwhile, the controller 40, the motor 50, the clutch 60 and the gear train 70 may be mounted to the outside of the frame 10, respectively, and they may be protected with the cover 12 such that the respective components are not damaged due to external force or prevented from being separated from the frame 10, as described-above. The retractor for a seat belt according to an embodiment of the present invention may be manufactured and sold separately from a seat and other components constituting a seat belt.

Hereinafter, referring to FIGS. 5 to 7, the clutch 60 will be described in detail. Here, FIGS. 5 and 6 are partial perspective views illustrating operational procedures of a retractor for a seat belt, respectively, and FIG. 7 is a perspective view illustrating a braking disk included in the retractor for a seat belt according to an exemplary embodiment of the present invention.

Figure 5:
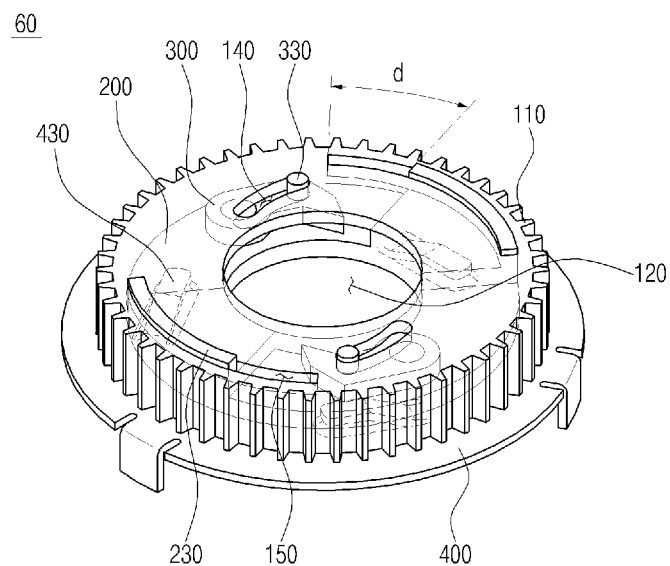
FIGS. 5 and 6 are partial perspective views illustrating operational procedures of a retractor for a seat belt, respectively.
Figure 6:
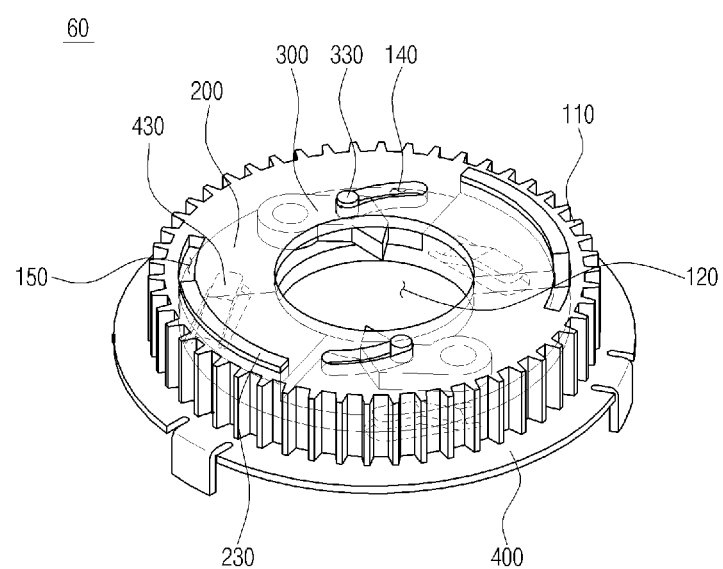

As shown in FIGS. 5 and 6, the clutch 60 according to the present invention may include a driven gear 100, a plate 200, a locking pole 300, and a braking disk 400.

The driven gear 100 is a constitutional element which receives a driving force from a driving gear 52 provided on a rotation shaft of the motor 50. The driven gear 100 is configured as an internal gear but it may be configured advantageously as an external gear in consideration of adding the gear train 70, and when it is configured as an external gear, the clutch 60 can be configured as shown in FIGS. 5 and 6.

That is, when the clutch 60 is configured as shown in FIGS. 5 and 6, gear teeth 110 that receives the driving force from the driving gear 52 is formed on an outer peripheral surface of the driven gear 100, a hole 120 through which a pinion gear 22 provided on a rotation shaft of the spool 20 can pass is provided on a middle, and one end 130 having the same width as that of the gear teeth 110 for receiving the plate 200 and the locking pole 300, as will be described later, is provided on the inside thereof to be indented, opposing to the plate 200.

Meanwhile, the plate 200 is provided at a place opposing one end of the driven gear 100 and is a component to be inter-connected with the driven gear, and when the plate 200 is inter-connected with the driven gear 100, it is stayed temporality due to a friction with the braking disk 400, as will be described later, to pivot the locking pole 300.

The plate 200 is formed with a circular plate such that when the driven gear 100 is configured as described-above, the plate 200 is inserted into the indented one end 130 of the driven gear 100.

At this time, the locking pole 300 may be mounted on one face of the plate 200, opposing the indented one end 130 of the driven gear 100, and in this case, the locking pole 300 is arranged between the driven gear 100 and the plate 200.

Further, a catching member 230 may protrude from one face of the plate 200 on which the locking pole 300 is mounted wherein the catching member 230 is caught over one side of a second oblong groove 150 formed on the indented one end 130 of the driven gear 100 so that the driven gear 100 and the plate 200 rotate together after the locking pole 300 is pivoted to be meshed with the pinion gear 22 of the spool 20.

That is, referring to an operation of the retractor for a seat belt according to an embodiment of the present invention, the catching member 230 is disposed on the other side of the second oblong groove 150 before firstly the driven gear 100 receives the driving force from the driving gear 52. However, after that, when the driven gear 100 rotates with the driving force transmitted from the driving gear 52 and the plate provided with the catching member 230 is stayed temporally by the braking disk 400, the catching member 230 is disposed on one side of the second oblong groove 150. The locking pole 300 is pivoted to be meshed with the pinion gear 22 while the catching member 230 is disposed on one side of the oblong groove 150, and then the driven gear 100, the plate 200 and the spool 20 rotate together.

Here, even if the catching member 230 and the oblong member 150 are not provided, the plate 200 and the locking pole 300 are coupled so that the plate 200 can be inter-connected with the driven gear 100 by the locking pole 300 after the locking pole 300 is meshed with the pinion gear 22. However, since the catching member 230 and the second oblong groove 150 are provided, the load applied between the locking pole 300 and the pinion gear 22 is diffused to the catching member 230 and the second oblong groove 150, and as a result the clutch 60 according to the present invention has a higher durability.

Furthermore, the other face 210 of the plate 200 opposing one face of the plate 200 to which the locking pole 300 is mounted is configured to be engaged with the braking disk 400, as will be described later.

At this time, the constitutional element of the braking disk 400 to be engaged with the other face 210 of the plate 200 may be a friction protrusion 430, as will be described later, and further a guide member (reference numeral is not given) for guiding the friction protrusion 430 may be formed on the other face 210 of the plate 200 in consideration of an arrangement direction of the friction protrusion 430 and a movement direction thereof with engagement with the plate 200.

Meanwhile, the braking disk 400 is provided to be engaged with the plate 200 and serves to stay temporally the plate 200 when the plate 200 is inter-connected to the driven gear 100.

The braking disk 400 may be formed in any shapes and configurations so long as it stays temporally the plate 200 with friction. However, the braking disk 400 as shown in FIG. 7 will be described in detail as an example.

Figure 7:
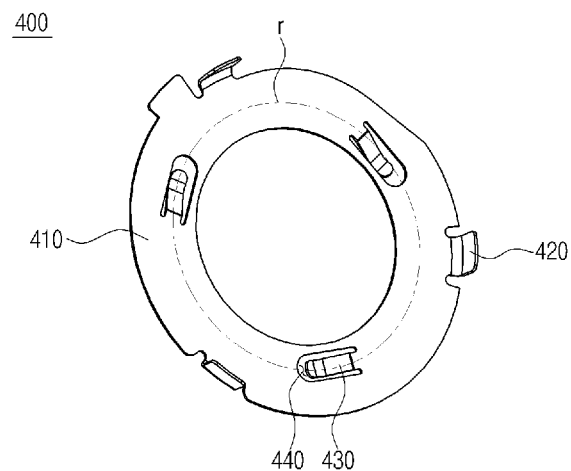
FIG. 7 is a perspective view illustrating a braking disk included in the retractor for a seat belt according to an exemplary embodiment of the present invention.

As shown in FIG. 7, the brake disk 400 may be provided with a body 410, a staying protrusion 420 and a friction protrusion 430.

The body 410 forms a whole outer shape of the brake disk 400 wherein it may be configured, corresponding to a shape of the other face 210 of the plate 200 to be engaged with the brake disk. That is, the body 410 may be formed with a circular plate having a hole (reference numeral is not given) through which the pinion gear 22 can pass at a middle thereof.

Meanwhile, the staying protrusion 420 is formed along an outer peripheral surface of the body 410 and allows the braking disk 400 to be stayed on the frame 10 or the cover 12.

Here, a plurality of staying protrusions 420 may be provided perpendicular to the other face of the brake disk 400 opposing one face thereof on which the friction protrusion 430 is formed; however, the number of the staying protrusion is not limited thereto.

Meanwhile, the friction protrusion 430 protrudes from one face of the body 410 opposing the other face 210 of the plate 200 to be in friction with the plate 200. Even though the other face 210 of the plate 200 and the entire one face of the body 410 may be engaged each other to be in friction, but when there is a place of the body where the greater drag applies toward the other face 210 of the plate 200, it may be in friction with the other face of the plate with greater frictional force, comparing to simple engagement of the other face of the plate and the one face of the body. The place as described-above in the body refers to the friction protrusion 430.

The friction protrusion 430 may be a boss that protrudes simply from one face of the body 410 toward the other face 210 of the plate 200, but it may be configured as shown in FIG. 7.

That is, a slit 440 may be formed on a part of a boundary surface between the body 410 and the friction protrusion 430 so that the friction protrusion 430 is movable toward the other face of the body from which the friction protrusion 430 protrudes, opposing the one face of the body 410. In detail, the friction protrusion 430 may be formed by cutting a part of the body 410 to protrude toward one face of the body 410 wherein a gap produced when the body is cut may form the slit 440.

The friction protrusion 430 with this configuration can be moved easily to the other face of the body 410 or the braking disk 400 can be manufactured easily.

That is, in case where the friction protrusion 430 is configured as shown in FIG. 7, when the plate 200 rotate after the locking pole 300 is mesh with the pinion gear 22, the friction protrusion 430 may be pushed toward the other face of the braking disk 400 not to interrupt greatly a rotation of the plate 200. Further, in case where the friction protrusion 430 is configured as shown in FIG. 7, the braking disk 400 may be manufactured by pressing once internally and externally a circular plate on a middle of which a hole is formed.

Meanwhile, a plurality of friction protrusions 430 may be formed in a radial direction around the hole formed on the body 410 to increase frictional force with the other face 210 of the plate 200. At this time, the boundary surface between the body 410 in which the slit 440 is formed and the friction protrusion 430 may be arranged on an imaginary circumference r around the hole formed on the body 410. This intends to remove interrupting factor when the plate 200 rotates after the locking pole 300 is meshed with the pinion gear 22.

Meanwhile, the locking pole 300 is meshed with the pinion gear 22 provided on a rotation shaft of the spool 20 to transmit the driving force transmitted from the driven gear 100 to the spool 20 wherein it may be mounted pivotably on one face 210 of the plate 200.

In more detail, in case where the clutch 60 is configured as shown in FIGS. 5 and 6, a coupling hole 320 may be provided on one end of the locking pole 300 to be coupled to a coupling pin 220 formed on one face 210 of the plate 200, and further a catching portion 310 may be provided on the other end thereof to be meshed with the pinion gear 22. Further, the locking pole 300 may be provided with a guide protrusion 330 that is inserted into a first oblong groove 140, as will be described later, on one face opposing the indented one end 130 of the driven gear 100.

The locking pole 300 configured as described-above is pivoted by a rotation of the driven gear 100 when the plate 200 is stayed temporally by the braking disk 400, to be meshed with the pinion gear 22 provided on a rotation shaft of the spool 20.

That is, the locking pole 300 is received in the indented one end 130 of the driven gear 100 before the driven gear 100 receives driving force from the driving gear 52, but when the driven gear 100 starts to rotate by receiving the driving force from the driving gear 52 and the plate 200 is stayed temporally by the braking disk 400, the locking pole 300 protrudes from an inner peripheral surface of the hole 120 provided on the driven gear 100 by a rotation of the driven gear 100.

At this time, a guide is provided on the indented one end 130 of the driven gear 100 to pivot the locking pole 300 by a rotation of the driven gear 100. Here, the guide may be various shapes and configurations; however, the guide may be, for example, the first oblong groove 140 into which the guide protrusion 330 provided on one face of the locking pole 300 is inserted, as shown in FIGS. 5 and 6.

That is, the guide protrusion 330 moves along the first oblong groove 140 formed from an outer peripheral surface of the driven gear 100 to a middle thereof when the driven gear 100 rotates, and thus the locking pole 300 mounted to the plate 200 is pivoted even though the plate 200 is stayed temporally by the braking disk 400.

The locking pole 300 pivoted as described-above is meshed with the pinion gear 22 provided on a rotation shaft of the spool 20, as described-above, to transmit the driving force that is generated from the motor 50 and transmitted through the driving gear 52 and the driven gear 100 to the spool 20.

However, when it is not necessary to transmit the driving force since afterwards the driving force is not generated further from the motor 50, the locking pole 300 is to be pivoted to be received into the indented one end 130 of the driven gear 100 as same as before the driven gear 100 receives the driving force from the driving gear 52.

Hereinafter, an operation of a retractor for a seat belt according to an embodiment of the present invention referring to FIGS. 8 to 11. Here, FIGS. 8 to 11 are side views illustrating operational procedures of a retractor for a seat belt, respectively.

As an example, when a vehicle accelerates rapidly, to which the retractor for a seat belt according to an embodiment of the present invention is mounted, the controller 40 recognizes this vehicle information and drives the motor 50 to pull-in forcibly the webbing 30.

Figure 8:
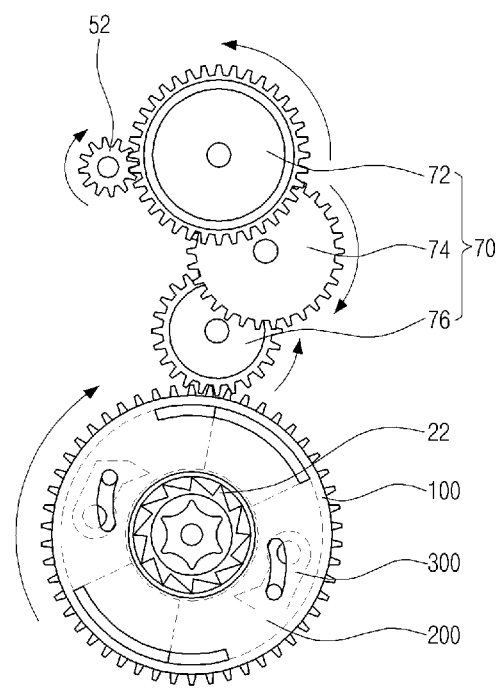
FIGS. 8 to 11 are side views illustrating operational procedures of a retractor for a seat belt, respectively.

When the motor 50 is driven, as shown in FIG. 8, the driving gear 52 provided on a rotation shaft of the motor 50 is driven clockwise to transmit the driving force to a first gear 72 of the gear train 70.

After that, the driving force transmitted to the first gear 72 is transmitted to the driven gear 100 of the clutch 60 through sequentially a second gear 74 and a third gear 76. At this time, the rotation velocity of the motor 50 is decreased gradually but the driving force increases gradually to be transmitted to the driven gear 100.

When the driving force is transmitted from the driving gear 52 to the driven gear 100, the driven gear 100 rotates clockwise. However, the plate 200 that is configured to be interconnected with the driven gear 100 is stayed temporally with friction with the brake disk 400.

Figure 9:
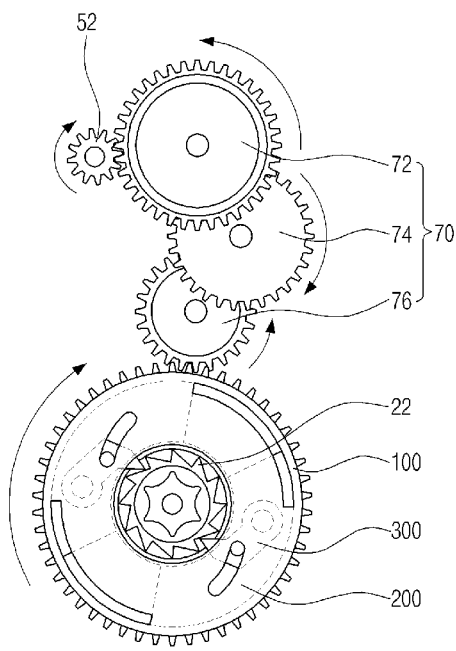

At this time, the guide protrusion 300 provided on the locking pole 300 is moved along the first oblong groove 140 provided on the driven gear 100 and the locking pole 300 is pivoted toward the hole 120 formed on a middle of the driven gear 100 to be meshed with the pinion gear 22 of the spool 20 that passes through the hole 120, as shown in FIG. 9.

Further, the plate 200 is stayed temporally but the driven gear 100 rotates continuously and thus a distance d between the catching member 230 provided on the plate 200 and the second oblong groove 150 formed in the driven gear 100 decreases and eventually the catching member 230 is caught over one side of the second oblong groove 150.

When the locking pole 300 is meshed with the pinion gear 22 and the catching member 230 is caught over the one side of the second oblong groove 150, the driving force generated from the motor 50 is transmitted to the spool 20 through sequentially the driving gear 52, the gear train 70, the driven gear 100, the locking pole 300 and the pinion gear 22 and thus the spool 20 rotates clockwise and the webbing (not shown) that is disposed on a left side of the spool 20 based on FIG. 8 is pulled-in as same as is adjusted initially by the controller 40.

Meanwhile, when a vehicle stops accelerating rapidly and travels normally, to which a retractor for a seat belt according to an embodiment of the present invention is mounted, it is not necessary no longer to pull-in the webbing 30. Rather, the webbing is pulled-in to only a proper extent to increasing wearable feeling of a seat belt by a passenger and may be pulled-out freely in accordance with a movement of the passenger.

Figure 10:
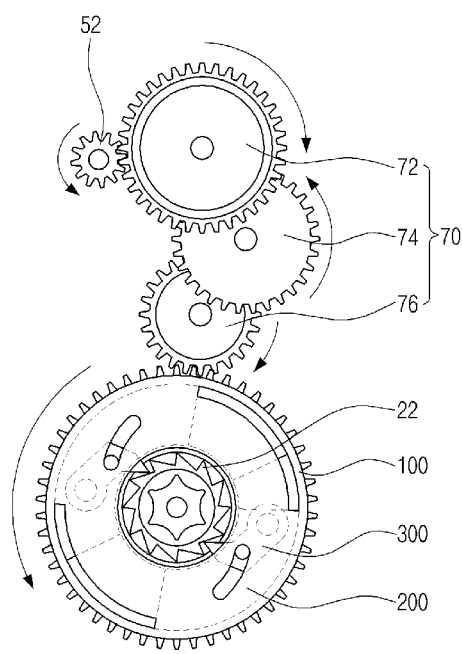
Figure 11:
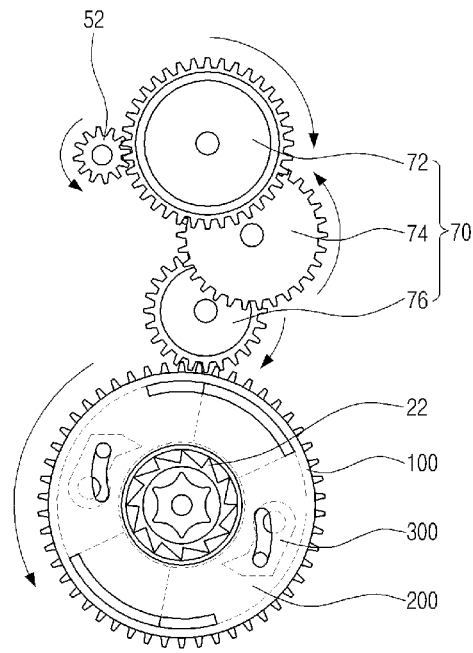

To this end, the locking pole 300 that is meshed with the pinion gear 22 when a vehicle accelerates rapidly has to be separated from the pinion gear 22 and this operation is the same as shown in FIGS. 10 and 11.

That is, when a vehicle stops accelerating rapidly and travels normally, the controller 40 controls the motor 50 to be rotated counterclockwise opposing a direction when a vehicle accelerates rapidly.

When the motor 50 is driven as described-above, as shown in FIG. 10, the driving gear 52 provided on a rotation shaft of the motor 50 is driven counterclockwise to transmit the driving force to the first gear 72 of the gear train 70.

After that, as described-above, the driving force transmitted to the first gear 72 is transmitted to the driven gear 100 of the clutch 60 through sequentially the second gear 74 and the third gear 76. At this time, the rotation velocity of the motor 50 decreases gradually, but the driving force increases gradually and it is transmitted to the driven gear 100.

When the driving force is transmitted from the driving gear 52 to the driven gear 100, the driven gear 100 rotates counterclockwise. However, the plate 200 that is configured to be inter-connected with the driven gear 100 is stayed temporally with friction with the braking disk 400.

At this time, the guide protrusion 330 provided on the locking pole 300 moves along the first oblong 140 provided on the driven gear 100 and the locking pole 300 is pivoted to be received into the indented one end 130 of the driven gear 100, and is separated from the pinion gear 22 as shown in FIG. 11.

In addition, the plate 200 is stayed temporally but the driven gear 100 rotates continuously, and thus the catching member 230 caught over one side of the second oblong groove 140 is separated gradually from one side of the second oblong groove 150, as shown in FIG. 6, and a distance between the catching member 230 and the second oblong groove 150 is separated by the initial distance d, as shown in FIG. 5.

As described-above, the locking pole 300 is separated from the pinion gear 22 and the distance between the catching member 230 and the second oblong groove 150 is separated by the initial distance d, and then there is no relation no longer between the motor 50 and the spool 20 to transmit the driving force.

Accordingly, a proper pulling-in and free pulling-out of the webbing 30 by an elastic unit (reference numeral is not given) that is mounted on the other end of the spool 20 can be implemented.

Figure 12:
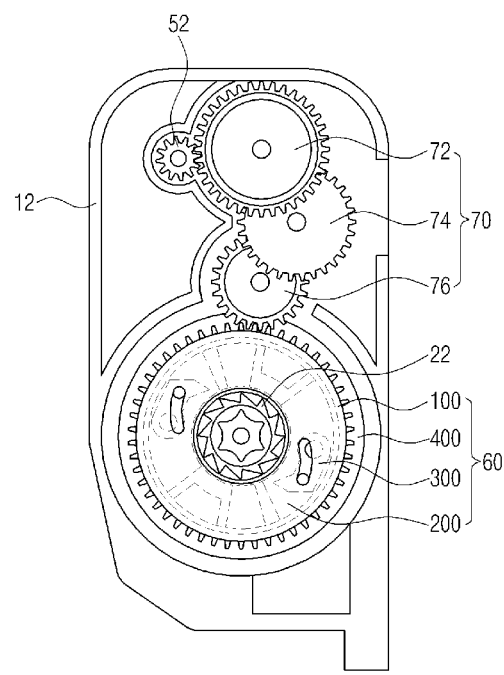
FIG. 12 is a side view illustrating a retractor for a seat belt according to another exemplary embodiment of the present invention.
Figure 13:
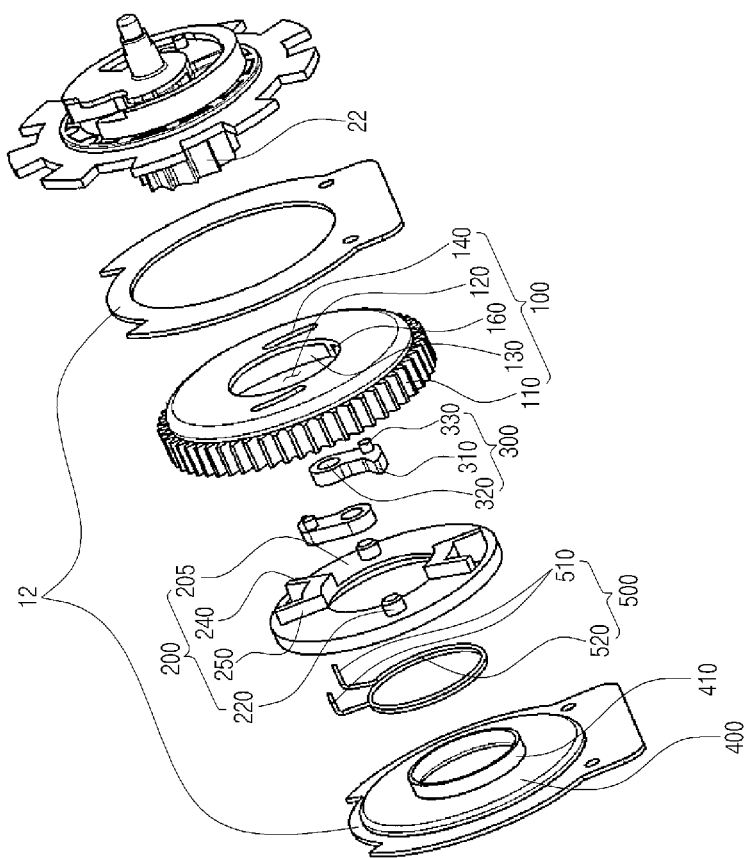
FIG. 13 is an exploded-perspective view illustrating a part of a retractor for a seat belt according to another exemplary embodiment of the present invention.
Figure 14:
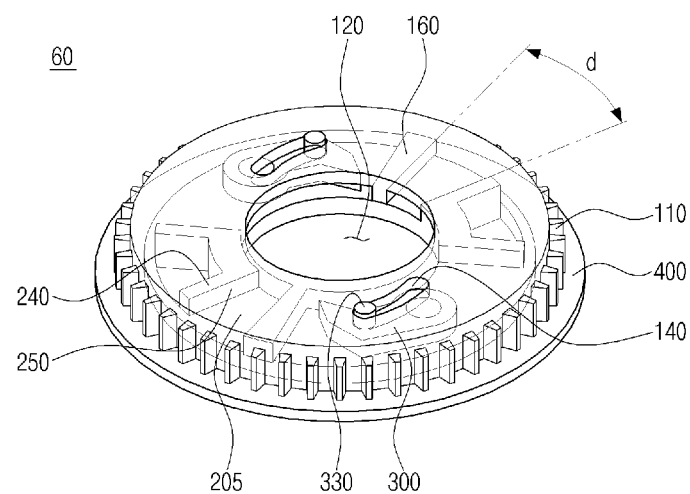
FIGS. 14 and 15 are partial perspective views illustrating a clutch for a retractor for a seat belt according to another exemplary embodiment of the present invention, respectively.
Figure 15:
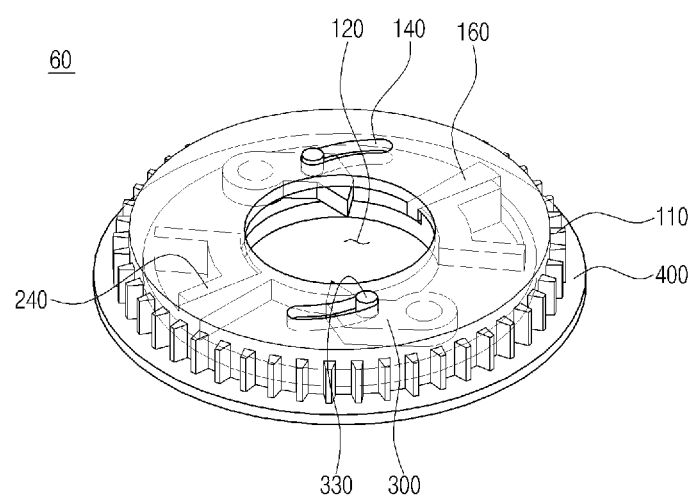

Next, the modified clutch 60 and the retractor for a seat belt according to another embodiment of the present invention will be described in detail referring to FIGS. 12 to 15. Here, FIG. 12 is a side view illustrating a retractor for a seat belt according to another exemplary embodiment of the present invention, FIG. 13 is an exploded-perspective view illustrating a part of a retractor for a seat belt according to another exemplary embodiment of the present invention, and FIGS. 14 and 15 are partial perspective views illustrating a clutch for a retractor for a seat belt according to another exemplary embodiment of the present invention.

As shown in FIGS. 12 to 15, the modified clutch 60 according to the present invention may include the driven gear 100, the plate 200, the braking disk 400 and the locking pole 300.

The driven gear 100 is a constitutional element which receives a driving force from a driving gear 52 provided on a rotation shaft of the motor 50. The driven gear 100 is configured as an internal gear but it may be configured advantageously as an external gear in consideration of adding the gear train 70, and when it is configured as an external gear, the clutch 60 can be configured as described later.

That is, the gear teeth 110 that receives the driving force from the driving gear 52 is formed on an outer peripheral surface of the driven gear 100, the hole 120 through which a pinion gear 22 provided on a rotation shaft of the spool 20 can pass is provided on a middle, and an one end 130 having the same width as that of the gear teeth 110 to receive the plate 200 and the locking pole 300, as will be described later, is provided to be indented on the inside, opposing the plate 200.

Meanwhile, the plate 200 is provided at a place opposing one end of the driven gear 100 and is a component to be inter-connected with the driven gear 100, and when the plate 200 is inter-connected with the driven gear 100, it is stayed temporality due to a friction with the braking disk 400, as will be described later, to pivot the locking pole 300.

The plate 200 is formed with a circular plate such that when the driven gear 100 is configured as described-above, the plate 200 is inserted into the indented one end 130 of the driven gear 100. At this time, the locking pole 300 may be mounted on one face 205 of the plate 200, opposing the indented one end 130 of the driven gear 100, and in this case, the locking pole 300 is arranged between the driven gear 100 and the plate 200.

Further, a contact portion 250 protrudes from one face 205 of the plate 100 to which the locking pole 300 is mounted and the contact portion is meshed with a contact member 160 provided on the indented one end 130 of the driven gear 100 to allow the driven gear 100 and the plate 200 to be rotated together after the locking pole 300 is pivoted to be meshed with the pinion gear 22 of the spool 20.

That is, with respect to an operation of a retractor for a seat belt according to another embodiment of the present invention, as will be described later, a distance between the contact member 160 and the contact portion 250 is separated before firstly the driven gear 100 receives the driving force from the driving gear 52, but afterwards when the driven gear 100 receives the driving force from the driving gear 52, the distance between the contact member 160 and the contact portion 250 is decreased. The locking pole 300 is pivoted while the distance between the contact member 160 and the contact portion 250 decreases, and the contact member 160 and the contact portion 250 is in contact each other after the locking pole 300 is meshed with the pinion gear 22, to allow the driven gear 100 and the plate 200 to be rotated together.

Here, even if the contact portion 160 and the contact member 250 are not provided, the plate 200 can be inter-connected with the plate 200 by the locking pole 300 after the locking pole 300 is meshed with the pinion gear 22. However, since the contact member 160 and the contact portion 250 are provided, a load applied between the locking pole 300 and the pinion gear 22 may be diffused to the contact member 160 and the contact portion 250 and as a result the clutch 60 according to the present invention may have greater durability.

Meanwhile, the braking disk 400 is provided to be engaged with the plate 200 and serves to stay temporally the plate 200 when the plate 200 is inter-connected with the driven gear 100.

The braking disk 400 as described-above is not necessarily formed with a circular plate as the plate 200 and may be configured as a circular shape in consideration of an entire shape of the clutch 60 and the cover 12, which will be described.

Further, the braking disk 400 may be fixed to the cover 12 constituting an outer form of the clutch 60. Accordingly, the braking disk is stopped to be in friction with the plate 200 when the plate 200 is inter-connected with driven gear 200, and the plate 200 is stayed temporally due to the friction and at this time the locking pole 300 is guided by the first oblong groove 140 of the driven gear, which will be described later, to be pivoted.

Meanwhile, the locking pole 300 is meshed with the pinion gear 22 provided on a rotation shaft of the spool 20 to transmit the driving force transmitted from the driven gear 100 to the spool 20 and it may be mounted pivotably to one face 205 of the plate 200.

In more detail, one end of the locking pole 300 may be provided with a coupling hole 320 to be coupled to a coupling pin 220 provided on one face 205 of the plate 200 and the other end thereof may be provided with a catching portion 310 to be meshed with the pinion gear 22. Further, the locking pole 300 may be provided with a guide protrusion 330 that in inserted into the first oblong groove 140, which will be described later, on one face thereof opposing the indented one end 130 of the driven gear 100.

The locking pole 300 having the configuration as described-above is pivoted by a rotation of the driven gear 100 to be meshed with the pinion gear 22 provided on a rotation shaft of the spool 20 when the plate 200 is stayed temporally by the braking disk 400.

That is, the locking pole 300 is received in the indented one end 130 of the driven gear 100 before the driven gear 100 receives driving force from the driving gear 52, but when the driven gear 100 starts to rotate by receiving the driving force from the driving gear 52 and the plate 200 is stayed temporally by the braking disk 400, the locking pole 300 protrudes from an inner peripheral surface of the hole 120 provided on the driven gear 100 by a rotation of the driven gear 100.

At this time, a guide is provided on the indented one end 130 of the driven gear 100 to pivot the locking pole 300 by a rotation of the driven gear 100. Here, the guide may be various shapes and configurations; however, the guide may be, for example, the first oblong groove 140 into which the guide protrusion 330 provided on one face of the locking pole 300 is inserted.

That is, the guide protrusion 330 moves along the first oblong groove 140 formed from an outer peripheral surface of the driven gear 100 to a middle thereof when the driven gear 100 rotates, and thus the locking pole 300 mounted to the plate 200 is pivoted even though the plate 200 is stayed temporally by the braking disk 400.

The locking pole 300 pivoted as described-above is meshed with the pinion gear 22 provided on a rotation shaft of the spool 20, as described-above, to transmit the driving force that is generated from the motor 50 and transmitted through the driving gear 52 and the driven gear 100, to the spool 20.

However, when it is not necessary to transmit the driving force since afterwards the driving force is not generated further from the motor 50, the locking pole 300 is to be pivoted to be received into the indented one end 130 of the driven gear 100 as same as before the driven gear 100 receives the driving force from the driving gear 52.

Meanwhile, the clutch 60 according to the present invention may further include a staying member 500.

Here, the staying member 500 serves to increase friction extent between the plate 200 and the braking disk 400 and is provided between the plate 200 and the braking disk 400 to stay the plate 200 temporally when the plate 200 is inter-connected with the driven gear 100.

Even though the staying member 500 may be formed in various shapes and configurations, it may be made exemplarily of elastic member of a ring shape as shown in FIG. 13. At this time, both ends 510 of the elastic member are mounted to a mounting portion 240 constituting the contact portion 250 so that the staying member may be fixed to the plate 200, and further an inner peripheral surface 520 thereof may be configured to be engaged with a circular protrusion 450 provided on the braking disk 400.

The staying member 500 configured as described-above serves to increase the friction extent between the plate 200 and the braking disk 400, as described-above, but does not serve to separate the locking pole 300 from the pinion gear in case where afterwards the driving force is not generated no longer from the driving motor 50 and further it is not necessary to transmit the driving force.

An operation of a retractor for a seat belt provided with a modified clutch 60 according to an embodiment of the present invention is not different greatly from that in the aforementioned embodiments, if there are any differences, it will be obviously inferred by a ordinary person; however, the detailed operation will be described again to help the ordinary person to understand sufficiently them. But, the drawing with respect to the operation which will be described later is omitted.

First, when a vehicle accelerates rapidly, to which the retractor for a seat belt according to another embodiment of the present invention is mounted, the controller 40 recognizes this state of the vehicle and drives the motor 50 to pull-in forcibly the webbing 30 and further the driving gear 52 provided on a rotation shaft of the motor 50 transmits the driving force to the first gear 72 of the gear train 70 while it is driven clockwise.

After that, the driving force transmitted to the first gear 72 is transmitted to the driven gear 100 of the clutch 60 through sequentially a second gear 74 and a third gear 76. At this time, the rotation velocity of the motor 50 is decreased gradually but the driving force increases gradually to be transmitted to the driven gear 100.

When the driving force is transmitted from the driving gear 52 to the driven gear 100, as described-above, the driven gear 100 rotates clockwise. However, the plate 200 that is configured to be inter-connected with the driven gear 100 is stayed temporally with friction with the brake disk 400.

At this time, the guide protrusion 330 provided on the locking pole 300 moves along the first oblong groove 140 provided on the driven gear 100 and the locking pole 300 is pivoted toward the hole 120 formed on a middle of the driven gear 100 to be meshed with the pinion gear 22 of the spool 20 that passes through the hole 120.

Further, the plate 200 is stayed temporally but the driven gear 100 rotates continuously and thus a distance d between the contact portion 250 provided on the plate 200 and the contact member 160 provided on the driven gear 100 decreases and eventually the contact portion 250 and the contact member 160 are engaged.

When the locking pole 300 is meshed with the pinion gear 22 and the contact portion 250 and the contact member 160 are engaged, the driving force generated from the motor 50 is transmitted to the spool 20 through sequentially the driving gear 52, the gear train 70, the driven gear 100, the locking pole 300 and the pinion gear 22 and thus the spool 20 rotates clockwise and the webbing (not shown) that is disposed on a left side of the spool 20 is pulled-in as same as is adjusted initially by the controller 40.

Meanwhile, on the contrary, when a vehicle stops accelerating rapidly and travels normally, to which a retractor for a seat belt according to another embodiment of the present invention is mounted, it is not necessary no longer to pull-in forcibly the webbing 30. Rather, the webbing is pulled-in to only a proper extent to increasing wearable feeling of a seat belt by a passenger and may be pulled-out freely in accordance with a movement of the passenger.

To this end, the locking pole 300 that is meshed with the pinion gear 22 when a vehicle accelerates rapidly has to be separated from the pinion gear 22. That is, when a vehicle stops accelerating rapidly and travels normally, the controller 40 controls the motor 50 to be rotated counterclockwise opposing a direction when a vehicle accelerates rapidly.

When the motor 50 is driven as described-above, the driving gear 52 provided on a rotation shaft of the motor 50 is driven counterclockwise to transmit the driving force to the first gear 72 of the gear train 70.

After that, as described-above, the driving force transmitted to the first gear 72 is transmitted to the driven gear 100 of the clutch 60 through sequentially the second gear 74 and the third gear 76. At this time, the rotation velocity of the motor 50 decreases gradually, but the driving force increases gradually and it is transmitted to the driven gear 100.

When the driving force is transmitted from the driving gear 52 to the driven gear 100, the driven gear 100 rotates counterclockwise. However, the plate 200 that is configured to be inter-connected with the driven gear 100 is stayed temporally with friction with the braking disk 400.

At this time, the guide protrusion 330 provided on the locking pole 300 moves along the first oblong 140 provided on the driven gear 100 and the locking pole 300 is pivoted to be received into the indented one end 130 of the driven gear 100, and is separated from the pinion gear 22.

In addition, the plate 200 is stayed temporally but the driven gear 100 rotates continuously, and thus the contact portion 250 and the contact member 160, which are engaged, are separated again by the initial distance d.

As described-above, the locking pole 300 is separated from the pinion gear 22, the contact portion 250 and the contact member 160 are separated by the initial distance d, and then there is no relation no longer between the motor 50 and the spool 20 to transmit the driving force.

Accordingly, a proper pulling-in and free pulling-out of the webbing 30 by an elastic unit (reference numeral is not given) that is mounted on the other end of the spool 20 can be implemented.

While the present invention has been described with respect to the specific embodiments, it will be apparent to those skilled in the art that various changes and modifications may be made without departing from the spirit and scope of the invention as defined in the following claims.

What is claimed is:

1. A clutch for use in a retractor for a seat belt through which a webbing wound on a spool is pulled-in by a driving force of a motor in accordance with vehicle information, the clutch comprising:
   a driven gear that receives the driving force from a driving gear provided on a rotation shaft of the motor;
   a plate that is provided at a place with one face of the plate opposing one end of the driven gear and is inter-connected with the driven gear;
   a braking disk that is provided to be engaged with another face of the plate, the other face of the plate opposing the one face of the plate, wherein the braking disk is facing the one end of the driven gear and is in friction with the plate to stay temporally the plate when the plate is inter-connected with the driven gear, wherein the braking disk comprises a friction protrusion that protrudes toward the plate to be in friction with the other face of the plate, and wherein a slit is formed on a part of a boundary surface where the friction protrusion is formed so that the friction protrusion is movable to a direction opposing a protruding direction of the friction protrusion; and
   a locking pole that is mounted pivotably to the one face of the plate is pivoted by a rotation of the driven gear when the plate is stayed temporally by the braking disk, the locking plate to be meshed with a pinion gear provided on a rotation shaft of the spool thereby transmitting the driving force transmitted from the driven gear to the spool, wherein the locking plate is in a location between the plate and the driven gear.

2. The clutch of claim 1, wherein the driven gear is provided with gear teeth on an outer peripheral surface to receive the driving force from the driving gear, wherein the driven gear is provided with a hole in a middle of the driven gear through which the pinion gear passes, and wherein the one end of the driven gear opposing the plate is dented to receive the plate and the locking pole.

3. The clutch of claim 2, wherein the plate is formed in a circular shape corresponding to a shape of the indented one end of the driven gear, wherein the plate is inter-connected with the driven gear by being inserted in the indented one end of the driven gear, and wherein the plate has a hole in a middle of the plate through which the pinion gear passes.

4. The clutch of claim 3, wherein the braking disk further comprises:
   a body in a circular shape corresponding to a shape of the other face of the plate, the body being provided with a hole in a middle of the body through which the pinion gear passes; and
   at least one staying protrusion provided on an outer peripheral surface of the body to be stayed on a cover that surrounds the clutch.

5. The clutch of claim 4, wherein the boundary surface in which the slit is formed is between the body of the braking disk and the friction protrusion so that the friction protrusion is movable toward the other face of the body from which the friction protrusion protrudes.

6. The clutch of claim 5, wherein the friction protrusion comprises a plurality of friction protrusions that are formed in a radial direction around the hole formed on the body of the braking disk and wherein the boundary surface in which the slit is formed is arranged on an imaginary circumference around the hole formed on the body of the braking disk.

7. The clutch of claim 5, wherein a second oblong groove is formed on the indented one end of the driven gear along an imaginary circumference around the hole formed in the middle of the driven gear, and a catching member that is caught over one side of a second oblong groove is provided on the one face of the plate opposing the indented one end of the driven gear to rotate the driven gear and the plate together.

8. The clutch of claim 7, wherein the catching member and the one side of the second oblong groove are separated by an initial distance before the driven gear receives the driving force from the driving gear, wherein the plate is stayed temporally with friction from the braking disk before the driven gear receives the driving force from the driving gear, wherein when the locking pole pivots to be meshed with the pinion gear in response to the driven gear receiving the driving force from the driving gear, the initial distance between the catching member and the one side of the second oblong groove is decreased gradually until the catching member is caught over the one side of the second oblong groove, and wherein the catching member is kept in a state of being caught over one side of the second oblong groove when the locking pole pivots to be meshed with the pinion gear and when the locking pole is meshed with the pinion gear.

9. The clutch of claim 3, wherein the braking disk is formed with a circular plate corresponding to a shape of the other face of the plate, wherein a hole is formed on the middle of the braking disk, and wherein the braking disk comprises a body that is stayed on a cover surrounding the clutch to be in friction with the plate.

10. The clutch of claim 9, wherein the plate is stayed temporally through a staying member mounted between the plate and the braking disk when the plate is inter-connected with the driven gear to increase friction between the plate and the braking disk.

11. The clutch of claim 10, wherein the staying member is made of an elastic member in a ring shape where both ends of the elastic member are fixed to the plate and an inner peripheral surface of the elastic member is engaged with a circular protrusion provided on the braking disk.

12. The clutch of claim 10, wherein the indented one end of the driven gear is provided with a contact member of the driven gear to be engaged with a contact portion that protrudes from the one face of the plate to rotate the driven gear and the plate after the locking pole is pivoted to be meshed with the pinion gear.

13. The clutch of claim 12, wherein the contact member of the driven gear and the contact portion of the plate are separated by an initial distance before the driven gear receives the driving force from the driving gear, wherein the plate is stayed temporally with friction from the braking disk before the driven gear receives the driving force from the driving gear, and wherein, when the locking pole pivots to be meshed with the pinion gear in response to the driven gear receiving the driving force from the driving gear, the initial distance between the contact member of the driven gear and the contact portion of the plate is decreased gradually until the contact member of the driven gear and the contact portion of the plate are engaged so that the driven gear and the plate are rotated together.

14. The clutch of claim 2, wherein:
the locking pole is pivoted to protrude from an inner peripheral surface of a hole provided on the driven gear to be meshed with the pinion gear, or
the locking is pivoted to be received into the indented one end of the driven gear to be separated from the pinion gear.

15. The clutch of claim 14, wherein the locking pole is guided by a guide provided on the indented one end of the driven gear, wherein the guide is configured with a first oblong groove into which a guide protrusion provided on one side of the locking pole is inserted, wherein the first oblong groove is formed from an outer peripheral surface of the driven gear to a middle thereof, and wherein the guide protrusion moves along the first oblong groove when the driven gear rotates thereby guiding the locking pole.

16. The clutch of claim 2, wherein a gear train is provided between the driving gear and the driven gear and wherein the driven gear receives the driving force from the driving gear through the gear train.

17. The clutch of claim 1, wherein the vehicle information is interpreted by a controller and the controller controls the driving of the motor.

18. The clutch of claim 1, wherein the braking disk is fixed to a cover surrounding the clutch.

19. The clutch of claim 18, further comprising a staying member which is made of elastic member in a ring shape, both ends of which are fixed to the plate, an inner peripheral surface of which is engaged with a circular protrusion provided on the braking disk wherein a friction extent between the plate and the braking disk is increased by staying temporally the plate when the plate is inter-connected with the driven gear.

20. A retractor for a seat belt, the retractor comprising:
a frame;
a spool, the spool being mounted rotatably to the inside of the frame;
a webbing, the webbing being wound on the spool to be pulled-in constantly to the inside of the frame and pulled-out freely from the inside of the frame to the outside thereof;
a controller, the controller for recognizing vehicle information and controlling the pulling-in of the webbing;
a motor, the motor generating a driving force to rotate the spool in accordance with the control of the controller, wherein the driving force is generated by a driving gear provided on a rotation shaft of the motor;
a gear train, the gear train comprising a plurality of gears configured to receive the driving force from the motor;
a clutch, the clutch receiving the driving force from the gear train and transmitting the driving force to the spool, wherein the clutch comprises:
a driven gear that receives the driving force from the gear train;
a plate that is provided at a place with one face of the plate opposing one end of the driven gear and is inter-connected with the driven gear;
a braking disk that is provided to be engaged with another face of the plate, the other face of the plate opposing the one face of the plate, wherein the braking disk is facing the one end of the driven gear and is in friction with the plate to stay temporally the plate when the plate is inter-connected with the driven gear, wherein the braking disk comprises a friction protrusion that protrudes toward the plate to be in friction with the other face of the plate, and wherein a slit is formed on a part of a boundary surface where the friction protrusion is formed so that the friction protrusion is movable to a direction opposing a protruding direction of the friction protrusion; and a locking pole that is mounted pivotably to the one face of the plate is pivoted by a rotation of the driven gear when the plate is stayed temporally by the braking disk, the locking plate to be meshed with a pinion gear provided on a rotation shaft of the spool thereby transmitting the driving force transmitted from the driven gear to the spool, wherein the locking plate is in a location between the plate and the driven gear.

* * * * *